US012765572B2

(12) United States Patent
Simonsen et al.

(10) Patent No.: US 12,765,572 B2
(45) Date of Patent: Oct. 20, 2026

(54) NON-TRANS AND COCOA BUTTER COMPATIBLE COMPOUND FAT COMPOSITION

(71) Applicant: AAK AB (PUBL), Malmö (SE)

(72) Inventors: Hannah Solati Simonsen, Aarhus C (DK); Morten Daugaard Andersen, Aarhus C (DK)

(73) Assignee: AAK AB (PUBL), Malmö (SE)

(*) Notice: Subject to any disclaimer, the term of this patent is extended or adjusted under 35 U.S.C. 154(b) by 170 days.

(21) Appl. No.: 18/838,415

(22) PCT Filed: Feb. 23, 2023

(86) PCT No.: PCT/SE2023/050159
§ 371 (c)(1),
(2) Date: Aug. 14, 2024

(87) PCT Pub. No.: WO2023/163639
PCT Pub. Date: Aug. 31, 2023

(65) Prior Publication Data

US 2025/0143342 A1 May 8, 2025

(30) Foreign Application Priority Data

Feb. 25, 2022 (SE) .................................... 2250257-9

(51) Int. Cl.
*A23G 1/38* (2006.01)
*A23D 9/04* (2006.01)
*A23G 1/50* (2006.01)

(52) U.S. Cl.
CPC ................. *A23G 1/38* (2013.01); *A23D 9/04* (2013.01); *A23G 1/50* (2013.01)

(58) Field of Classification Search
CPC ................ C11C 3/02; C11C 3/10; A23G 1/38
See application file for complete search history.

(56) References Cited

U.S. PATENT DOCUMENTS

2011/0166227 A1 7/2011 Perlman et al.

FOREIGN PATENT DOCUMENTS

| | | | |
|---|---|---|---|
| EP | 0093602 | A2 | 11/1983 |
| WO | 2013132284 | A1 | 9/2013 |
| WO | 2014141904 | A1 | 9/2014 |
| WO | 2015150405 | A1 | 10/2015 |
| WO | 2020178180 | A1 | 9/2020 |

OTHER PUBLICATIONS

International Search Report for International Application No. PCT/SE2023/050159 dated Apr. 11, 2023 (4 pages).
Written Opinion of the International Searching Authority for International Application No. PCT/SE2023/050159 dated Apr. 11, 2023 (6 pages).
Biswas et al., "Physicochemical Properties of Enzymatically Produced Palm-Oil-Based Cocoa Butter Substitute (CBS) With Cocoa Butter Mixture," European Journal of Lipid Science and Technology, 120 (2018).
Lipp et al., "Review of cocoa butter and alternative fats for use in chocolate—Part A. Compositional data," Food Chemistry, 62(1):73-97 (1998).
Quast et al., "Physical properties of tempered mixtures of cocoa butter, CBR and CBS fats," International Journal of Food Science & Technology, 48:1579-1588 (2013).

*Primary Examiner* — Michele L Jacobson
(74) *Attorney, Agent, or Firm* — Finnegan, Henderson, Farabow, Garrett & Dunner LLP

(57) ABSTRACT

Disclosed is a fat composition comprising different triglycerides with at least some of the triglycerides comprising C14-fatty acids where at least part of said C14-fatty acids are found as MMM, MOM, MMO, MMSt, MStM, MMP, MPM, MStO, MOSt, MPO, or MOP triglycerides. Disclosed is further the use of such fat composition as a high cocoa butter compatible Cocoa butter replacer. The fat composition is for use in bakery, dairy, or confectionary applications or in chocolate or chocolate-like coating or in chocolate or chocolate-like moulded products such as tablets and bars. A fat composition as disclosed shows the possibility to produce chocolate-like compounds with higher amount of cocoa butter in the fat phase without compromising the quality. The fats of the composition are preferably of non-animal origin, for example of vegetable origin, chemically synthesized and/or synthesized by cultivation.

26 Claims, No Drawings

NON-TRANS AND COCOA BUTTER COMPATIBLE COMPOUND FAT COMPOSITION

The present application is a national stage entry of PCT/SE2023/050159, filed Feb. 23, 2023, which claims priority to Swedish Application No. 2250257-9, filed Feb. 25, 2022. The entire contents of each application are hereby incorporated by reference.

TECHNICAL FIELD OF THE INVENTION

The present invention relates to a fat composition comprising different triglycerides with at least some of the triglycerides comprising C14-fatty acids, where at least part of said C14-fatty acids are found as MMM, MOM, MMO, MMSt, MStM, MMP, MPM, MStO, MOSt, MPO, or MOP triglycerides. The invention also relates to use of such fat composition as a high cocoa butter compatible Cocoa butter replacer and further relates to uses of the fat composition in bakery, dairy, or confectionary applications or in chocolate or chocolate-like coating. The fat composition is preferably of non-animal origin, for example, of vegetable origin, chemically synthesized, and/or synthesized by cultivation.

BACKGROUND OF THE INVENTION

The main dietary source of industrial trans-unsaturated fatty acids are partially hydrogenated vegetable oils. The World Health Organization argues that the removal of partially hydrogenated vegetable oils from the food supply would result in substantial health benefits.

After determining in June 2015 that partially hydrogenated oils (PHOs) were no longer 'generally recognized as safe' for use in human food, the United States Food and Drug Administration requested food manufacturers to remove them from products by June 2018.

The European Union does not currently have legislation regulating the content of trans-unsaturated fatty acids in food products or requiring their labelling. Thus, should a product contain partially hydrogenated oils (and hence, possibly trans-unsaturated fatty acids), its label will indicate this, but it will not indicate the exact amount of trans-unsaturated fatty acids present in said product.

However, more and more EU Member States are setting legal limits on industrially produced trans-unsaturated fatty acids in foods and there has been growing pressure to establish this as an EU-wide practice. This legislation trend about non-trans-unsaturated fatty acids is not only present in EU and US but is spreading all over the world. In Russia, in January 2018, legislation changed the safety parameter "trans-isomers of fatty acids" from 20% to 2% of the product's fat content.

Increasing global transformation from high-trans cocoa butter replacer (CBR) to low/no-trans CBR due to legislation will be a big challenge for confectionery producers of high-trans CBR, especially to limit/eliminate trans-containing applications while maintaining the good properties of such products.

Moreover, the customers who already switched from a high-trans CBR to a low-trans CBR solution seems not to be fully satisfied with the different solutions from fat and oil producers.

Using high-trans CBR has the advantages of a short setting time, high gloss, high cocoa butter (CB) tolerance (most high-trans CBR has cocoa butter compatibility of up to 25% on the fat basis), and a non-lauric product (i.e. the fatty acids do not contain lauric acid), while it has the obvious disadvantage of a high trans-unsaturated fatty acids content.

Some of the best in market low-trans (or non-trans) CBR have the advantages of a low to no content trans-unsaturated fatty acids and it may contain a similar saturated fatty acid content compared to CB (some do contain more), while they have the disadvantages of a longer setting time, a less glossy end product, lower cocoa butter tolerance (most low/non-trans CBR has cocoa butter compatibility of less than 12% on the fat basis), and a poorer meltdown, all compared to high-trans CBR. Therefore, compounds such as low/non-trans CBR have limited compatibility with cocoa butter.

Accordingly, the main object of the invention is to provide a fat product, which provides a non-trans CBR with high compatibility with cocoa butter suitable as a true alternative to the high trans CBRs in the market today.

SUMMARY OF THE INVENTION

Disclosed herein in a first aspect is a fat composition comprising:

- from 4% to 50% by weight of C14-fatty acids compared to the total weight of fatty acids;
- from 40% to 95% by weight of saturated fatty acids compared to the total weight of fatty acids;
- from 15% to 70% by weight of the sum of SatSatO and SatOSat triglycerides compared to the total weight of triglycerides;
- a ratio of the weight of SatSatO triglycerides to the weight of SatOSat triglycerides between 1 and 5;
- at least 1% by weight of the sum of MOM and MMO triglycerides compared to the total weight of triglycerides;
- at least 1% by weight of the sum of MMSt, MStM, MMP, and MPM triglycerides compared to the total weight of triglycerides;
- at least 1% by weight of the sum of MStO, MOSt, MPO, and MOP triglycerides compared to the total weight of triglycerides; and
- at least 1% by weight of the sum of MMM triglycerides compared to the total weight of triglycerides;

wherein Sat is saturated fatty acids selected from C16-, C18-, C20-, C22-, and/or C24-fatty acids, and wherein M is myristic acid (C14:0), P is palmitic acid (C16:0), St is steric acid (C18:0), and O is oleic acid (C18:1).

One of the advantages of the fat composition of the invention is that it allows compound producers to include at least 15% cocoa butter on the fat basis and maintain the quality of the product specifically with respect to bloom stability for a long period. Further, since the fat composition of the invention can tolerate high amount of cocoa butter, it can be combined with cocoa mass to achieve a richer cocoa flavor than if only cocoa powder was used.

This is further illustrated in the exemplary section below, where it can be seen that the fat composition of the present invention provides the possibility to produce chocolate-like compounds with at least 20% cocoa butter in the fat phase with long shelf-life and without having to make a substantial compromise of production like capacity in both coating and molding applications. The present invention is therefore novel in providing a non-trans CBR with high (above 5%, such as e.g. 20%) compatibility with cocoa butter, and the fat composition of the invention hereby provides CBR with high compatibility with cocoa butter, which may be used as a true alternative to the high trans CBRs used in the market today, solving the above-described problems within the art.

Disclosed herein in a second aspect is a fat and cocoa butter composition comprising the fat composition according to the first aspect and a cocoa butter containing component selected from cocoa butter, cocoa mass, and/or cocoa powder, wherein the cocoa butter containing component is in an amount resulting in a cocoa butter content in an amount between 5% and 30% by weight compared to the total weight of fat in the fat and cocoa butter composition.

Disclosed herein in a third aspect is the use of a fat composition according to the first aspect for bakery, dairy, or confectionary applications, or confectionary moulding application, or in coating or enrobing for nuts, bakery or confectionary applications, such as bakery or confectionary application, selected from biscuit, cake, muffin, donut, pastry, or bread applications; or in fillings, such as bakery fillings and confectionary fillings; or for chocolate and chocolate-like coatings; or for chocolate or chocolate-like spreads, which are spreadable at room temperature.

Disclosed herein in a fourth aspect is the use of a fat and cocoa butter composition according to the second aspect for bakery, dairy, or confectionary applications, such as confectionary moulding application, or in coating or for nuts, bakery or confectionary applications, such as bakery or confectionary applications selected from biscuit, cake, muffin, donut, pastry, or bread applications; or in fillings, such as bakery fillings and confectionary fillings; or for chocolate and chocolate-like coatings; or for chocolate or chocolate-like spreads, which are spreadable at room temperature.

Disclosed herein in a fifth aspect is a confectionary or chocolate or chocolate-like product comprising between 25% and 70% by weight, such as between 25% and 60%, such as between 25% and 50%, such as between 25% and 40%, or such as between 28% and 40% by weight of a fat composition according to the first aspect.

Disclosed herein in a sixth aspect is use of a fat composition as a cocoa butter (CB) compatible cocoa butter replacer (CBR), the fat composition comprising:

- from 4% to 50% by weight of C14-fatty acids compared to the total weight of fatty acids;
- from 40% to 95% by weight of saturated fatty acids compared to the total weight of fatty acids;
- from 15% to 70% by weight of the sum of SatSatO and SatOSat triglycerides compared to the total weight of triglycerides;
- a ratio of the weight of SatSatO triglycerides to the weight of SatOSat triglycerides between 1 and 5;
- at least 1% by weight of the sum of MOM and MMO triglycerides compared to the total weight of triglycerides;
- at least 1% by weight of the sum of MMSt, MStM, MMP, and MPM triglycerides compared to the total weight of triglycerides;
- at least 1% by weight of the sum of MStO, MOSt, MPO, and MOP triglycerides compared to the total weight of triglycerides; and
- at least 1% by weight of the sum of MMM triglycerides compared to the total weight of triglycerides;

wherein Sat is saturated fatty acids selected from C16-, C18-, C20-, C22-, and/or C24-fatty acids, and wherein M is myristic acid (C14:0), P is palmitic acid (C16:0), St is steric acid (C18:0), and O is oleic acid (C18:1).

Definitions

As used herein, the term “vegetable” shall be understood as originating from a plant. Thus, vegetable fat or vegetable triglycerides are still to be understood as vegetable fat or vegetable triglycerides if all the fatty acids used to obtain said triglyceride or fat are of plant origin.”

For saturated fatty acids, the abbreviation SAFA may be used. Saturated fatty acids are chains of carbon atoms joined by single bonds, with the maximum number of hydrogen atoms attached to each carbon atom in the chain. Unsaturated fatty acids are chains of carbon atoms joined by single bonds and varying numbers of double bonds, which do not have their full quota of hydrogen atoms attached. An unsaturated acid can exist in two forms, the cis form and the trans form, as the double bond may exhibit one of two possible configurations: trans or cis. In trans configuration (a trans fatty acid), the carbon chain extends from opposite sides of the double bond, whereas, in cis configuration (a cis fatty acid), the carbon chain extends from the same side of the double bond. The trans fatty acid is a straighter molecule. The cis fatty acid is a bent molecule.

In this application, “Sat” means a subgroup of saturated fatty acids. The saturated fatty acids referred to herein as “Sat” are the saturated fatty acids selected from C16-, C18-, C20-, C22-, and/or C24-fatty acids. The fatty acids, which are comprised in the triglycerides of formulae SatSatO, SatOSat, etc., and referred to in the ratio of SatSatO to SatOSat, may be identical or different, saturated fatty acids. O is oleic acid, which is an unsaturated fatty acid.

Using the terminology that a value is in a range, such as when stating that A is between X and Y, means that both values X and Y are also included in the range. Such ranges are seen as disclosed similar to a range stating that A is in an amount from X to Y. An example from the description could be that the ratio of the weight of SatSatO triglycerides to the weight of SatOSat triglycerides is between 1.0 and 5.0, means that both 1.0 and 5.0 is included in the range from 1.0 to 5.0, hereby disclosing all numbers in such range with both endpoints included. This is meant for all ranges disclosed herein unless specifically stated otherwise.

Using the nomenclature CX means that the fatty acid comprises X carbon atoms, e.g. a C14-fatty acid has 14 carbon atoms while a C16-fatty acid has 16 carbon atoms.

Using the nomenclature CX:Y means that the fatty acid comprises X carbon atoms and Y double bonds, e.g. a C14:0 fatty acid has 14 carbon atoms and 0 double bonds while a C18:1 fatty acid has 18 carbon atoms and 1 double bond.

A ratio of the weight of SatSatO triglycerides to the weight of SatOSat triglycerides means that the weight of SatSatO triglycerides is divided by the weight of SatOSat triglycerides (SatSatO/SatOSat), where Sat means a saturated fatty acid selected from C16-, C18-, C20-, C22-, and/or C24-fatty acids, and O means an oleic acid. SatSatO is an asymmetrical di-saturated triglyceride, in which a saturated fatty acid occupies the sn1 and sn2 positions, and an oleic acid occupies the sn3 position; or a saturated fatty acid occupies the sn2 and sn3 positions, and an oleic acid occupies the sn1 position. SatOSat is a symmetrical di-saturated triglyceride in which a saturated fatty acid occupies the sn1 and sn3 positions, and an oleic acid occupies the sn2 position.

Sn1/sn2/sn3:

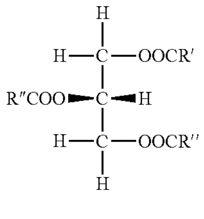

position sn-1
position sn-2
position sn-3

Fischer Projection of a Natural L-Glycerol Derivative

In general, triglycerides use a "sn" notation, which stands for stereospecific numbering. In a Fischer projection of a natural L-glycerol derivative, the secondary hydroxyl group is shown to the left of C-2; the carbon atom above this then becomes C-1 and that below becomes C-3. The prefix 'sn' is placed before the stem name of the compound.

Solid fat content (SFC) is a measure of the percentage of fat in crystalline (solid) phase to total fat (the remainder being in liquid phase) across a temperature gradient. In theory, SFC values can be any number from 0 to 100; however, due to detection limits of the instrument used in the method, in effect, the boundaries are around 0.5 to 98.

As used herein, "%" or "percentage" relates to weight percentage i.e. wt. % or wt.-% if nothing else is indicated.

As used herein, "vegetable oil" and "vegetable fat" are used interchangeably, unless otherwise specified.

As used herein the term "single-cell oil" shall mean oil from oleaginous microorganisms which are species of yeasts, molds (fungal), bacteria and microalgae. These single-cell oils are produced intracellular and in most cases during the stationary growth phase under specific growth conditions (e.g. under nitrogen limitation with simultaneous excess of a carbon source). Examples of oleaginous microorganisms are, but not limited to, *Mortierella alpineea, Yarrowia lipolytica, Schizochytrium, Nannochloropsis, Chlorella, Crypthecodinium cohnii, Shewanella.*

As used herein, "cocoa butter replacer" is intended to mean an edible fat having a triglyceride composition significantly different to cocoa butter. Cocoa butter replacers can have from high to low and even no trans fatty acids in their triglyceride composition. Cocoa butter replacers are only mixable with cocoa butter in medium to small ratios. Furthermore, in contrast to chocolate, cocoa butter replacer-based compounds do not need to undergo a treatment at different temperatures, known as tempering, prior to molding, coating, or enrobing, in order to obtain a final product with acceptable shelf life.

By "compound" is meant a product made from a combination of cocoa butter and (vegetable) fats. A compound may also comprise milk fat in various amounts. It is used as a lower-cost alternative to true chocolate, as it uses less-expensive hard (vegetable) fats in place of the more expensive cocoa butter. It may also be known as "compound coating" or "chocolatey coating" when used as a coating for confectionary or candy.

As used herein "edible" is something that is suitable for use as food or as part of a food product, such as a dairy or confectionary product.

For products and methods in the confectionery areas, reference is made to "Chocolate, Cocoa and Confectionery", B. W. Minifie, Aspen Publishers Inc., 3. Edition 1999.

A food product is a product for human consumption. An important group of products is those where cocoa butter and cocoa butter-like fats are used.

By a "chocolate or chocolate-like product" is meant a product, which at least is experienced by the consumer as chocolate or as a confectionery product having sensorial attributes common with chocolate, such as e.g. melting profile, taste etc. Some chocolate comprises cocoa butter, typically in substantial amounts, where some chocolate-like products may be produced with a low amount of or even without cocoa butter, e.g., by replacing the cocoa butter with a cocoa butter equivalent, cocoa butter substitute, etc. In addition, many chocolate or chocolate-like products comprise cocoa powder or cocoa mass, although some chocolate or chocolate-like products, such as typical white chocolates, may be produced without cocoa powder, but e.g. drawing its chocolate taste from cocoa butter. Depending on the country and/or region there may be various restrictions on which products may be marketed as chocolate.

The term "comprising" or "to comprise" is to be interpreted as specifying the presence of the stated parts, steps, features, or components, but does not exclude the presence of one or more additional parts, steps, features, or components.

As used herein, the term "and/or" is intended to mean the combined ("and") and the exclusive ("or") use, i.e. "A and/or B" is intended to mean "A alone, or B alone, or A and B together".

M is myristic acid (C14:0), P is palmitic acid (C16:0), St is steric acid (C18:0), and O is oleic acid (C18:1).

By a "randomly interesterified fat blend", is meant a fat blend, where the triglycerides in said fat blend have been subjected to a random interesterification step, i.e., randomly interesterified. Randomly interesterified means that the fatty acids are randomly rearranged in triglyceride structures without changing the fatty acid profile, until equilibrium point of reaction is reached. Accordingly, the triglyceride profile of randomly interesterified fat blends can be calculated by probability laws from their fatty acid composition. Interesterification should be understood as replacing one or more of the fatty acid moieties of a triglyceride with another fatty acid moiety or exchanging one or more fatty acid moieties from one triglyceride molecule to another. A fatty acid moiety may be understood as a free fatty acid, a fatty acid ester, a fatty acid anhydride, an activated fatty acid and/or the fatty acyl part of a fatty acid. The term "transesterification" may be used interchangeably with "interesterification". The interesterification process may be an enzymatic interesterification or chemical interesterification. Both chemical interesterification and enzymatic interesterification is described well in the art. Both chemical and enzymatic interesterification may be done by standard procedures and depending on the choice they may be performed either randomly or site-specific.

As used herein the term "non-lauric" means that the composition has a negligible amount of lauric acid (C12:0), such as less than 0.5%, i.e. by non-lauric is meant that the fat composition does not contain C12 fatty acids or have negligible amount of lauric acid in their composition, <0.5% by weight.

As used herein, the term "fatty acid" encompasses free fatty acids and fatty acid residues in triglycerides.

As used herein, the term cocoa butter (CB)—or high cocoa butter (CB)—compatibility/tolerance/compatible/tolerant means that the CBR has at least 5 wt-% compatibility with cocoa butter, such as at least 10 wt-%, such as at least 15 wt-%, such as at least 20 wt-%, such as at least 25 wt-%, and even 30 wt-% compatibility with cocoa butter. This allows compound producers to include a high amount of cocoa butter on the fat basis and maintain the quality of the compound product specifically with respect to bloom stability for a long period of time.

DETAILED DESCRIPTION OF THE INVENTION

When describing the below embodiments, the present invention envisages all possible combinations and permutations of the below-described embodiments with the above-disclosed aspects.

The invention relates to a fat composition comprising: from 4% to 50% by weight of C14-fatty acids compared to the total weight of fatty acids; from 40% to 95% by weight of saturated fatty acids compared to the total weight of fatty acids; from 15% to 70% by weight of the sum of SatSatO and SatOSat triglycerides compared to the total weight of triglycerides; a ratio of the weight of SatSatO triglycerides to the weight of SatOSat triglycerides between 1 and 5; at least 1% by weight of the sum of MOM and MMO triglycerides compared to the total weight of triglycerides; at least 1% by weight of the sum of MMSt, MStM, MMP, and MPM triglycerides compared to the total weight of triglycerides; at least 1% by weight of the sum of MStO, MOSt, MPO, and MOP triglycerides compared to the total weight of triglycerides; and at least 1% by weight of the sum of MMM triglycerides compared to the total weight of triglycerides; wherein Sat is saturated fatty acids selected from C16-, C18-, C20-, C22-, and/or C24-fatty acids, and wherein M is myristic acid (C14:0), P is palmitic acid (C16:0), St is steric acid (C18:0), and O is oleic acid (C18:1).

The invention also relates to use of a fat composition (as disclosed herein) as a cocoa butter compatible CRR. Hence, the invention relates to use of a fat composition as a cocoa butter (CB) compatible cocoa butter replacer (CBR), the fat composition comprising:

- from 4% to 50% by weight of C14-fatty acids compared to the total weight of fatty acids;
- from 40% to 95% by weight of saturated fatty acids compared to the total weight of fatty acids;
- from 15% to 70% by weight of the sum of SatSatO and SatOSat triglycerides compared to the total weight of triglycerides;
- a ratio of the weight of SatSatO triglycerides to the weight of SatOSat triglycerides between 1 and 5;
- at least 1% by weight of the sum of MOM and MMO triglycerides compared to the total weight of triglycerides;
- at least 1% by weight of the sum of MMSt, MStM, MMP, and MPM triglycerides compared to the total weight of triglycerides;
- at least 1% by weight of the sum of MStO, MOSt, MPO, and MOP triglycerides compared to the total weight of triglycerides; and
- at least 1% by weight of the sum of MMM triglycerides compared to the total weight of triglycerides;

wherein Sat is saturated fatty acids selected from C16-, C18-, C20-, C22-, and/or C24-fatty acids, and wherein M is myristic acid (C14:0), P is palmitic acid (C16:0), St is steric acid (C18:0), and O is oleic acid (C18:1).

In one or more embodiments the CBR is a non-trans CBR.

In one or more embodiments the fat composition is used as a high cocoa butter (CB) compatible cocoa butter replacer (CBR).

In one or more embodiments the CBR has at least 5% by weight compatibility with cocoa butter, such as at least 10%, such as at least 15%, such as at least 20%, such as at least 25%, or such as at least 30% by weight compatibility with cocoa butter.

The fat composition is preferable of non-animal origin, for example of vegetable origin, chemically synthesized, and/or synthesized by cultivation.

Thus, the fat composition of the present invention is a unique player when it comes to a non-trans CBR with high (at least 15%) compatibility with cocoa butter, where one of the main advantages of the fat composition of the invention is that it allows compound producers to include at least 15% cocoa butter on the fat basis and maintain the quality of the compound product specifically with respect to bloom stability for a long period of time. Since the fat composition of the invention can tolerate high amount of cocoa butter, it can be combined with cocoa mass to achieve a richer cocoa flavor than if only cocoa powder is used.

By "selected from C16-, C18-, C20-, C22-, and/or C24-fatty acids" is meant that the "Sat" in SatSatO and SatOSat can be selected from the same saturated fatty acid, meaning that SatSatO can be e.g., C16C16O (PPO) or C18C18O (StStO) or it can be individually selected from C16-, C18-, C20, C22-, and/or C24-fatty acids meaning that SatSatO can be e.g., C16C18O (PStO) or C18C16O (StPO).

By "from 4% to 50% by weight of C14-fatty acids compared to the total weight of fatty acids" is meant that between 4% and 50% of the total weight of fatty acids in the triglycerides of the fat composition is from C14-fatty acids.

By "from 40% to 95% by weight of saturated fatty acids compared to the total weight of fatty acids" is meant that between 40% and 95% of the total weight of fatty acids in the triglycerides of the fat composition is saturated fatty acids. Saturated fatty acids are chains of carbon atoms joined by single bonds, with the maximum number of hydrogen atoms attached to each carbon atom in the chain, in accordance with the above definitions.

By "from 15% to 70% by weight of the sum of SatSatO and SatOSat triglycerides compared to the total weight of triglycerides" is meant that the total amount of SatSatO and SatOSat triglycerides is between 15% and 70% of the total weight of triglycerides of the fat composition.

In one or more embodiments, the fat composition comprises from 0% to 1% by weight of saturated C12-fatty acids compared to the total weight of fatty acids.

By "from 0% to 1% by weight of C12-fatty acids compared to the total weight of fatty acids" is meant that between 0% and 1% of the total weight of fatty acids in the triglycerides of the fat composition is from C12-fatty acids.

In one or more embodiments, the fat composition comprises from 0% to 3% by weight of saturated C12-fatty acids compared to the total weight of fatty acids, such as from 0% to 2%, or such as from 0% to 1%. In one or more embodiments, the fat composition is non-lauric, i.e. comprises less than 0.5% by weight of C12-fatty acids.

In one or more embodiments, the fat composition comprises 5% or less by weight of trans-unsaturated fatty acids compared to the total weight of fatty acids, such as 4% or less by weight, such as 2% or less by weight, such as 2% or less by weight, or such as 1% or less by weight of trans-unsaturated fatty acids compared to the total weight of fatty acids.

By "5% or less by weight of trans-unsaturated fatty acids compared to the total weight of fatty acids" is meant that 5% or less of the total weight of fatty acids in the triglycerides of the fat composition is from trans-unsaturated fatty acids. In one or more embodiments, the fat composition is a non-trans fat composition.

In one or more embodiments, the fat composition is a fat composition comprising less than 1% by weight of trans-unsaturated fatty acids compared to the total weight of fatty acids, such as less than 0.8% by weight, such as less than 0.6% by weight, such as less than 0.5% by weight, or such as less than 0.2% by weight of trans-unsaturated fatty acids compared to the total weight of fatty acids.

In one or more embodiments, the fat composition is non-hydrogenated. Hydrogenation is a process where unsaturated fatty acids are made partially saturated. Non-hydrogenated means not hydrogenated or un-hydrogenated. By subjecting unsaturated fatty acids to a process of hydrogenation (e.g. involving a combination of catalysts, hydrogen, and heat), the double bond opens, and hydrogen atoms bind to the carbon atoms, hereby saturating the double bond. While most of the unsaturated oil will either remain as was (on its double bond structure) or be converted to the corresponding saturated fatty acid, some of the double bonds may open during the hydrogenation process and then re-close in another double bond configuration, hereby converting a cis fatty acid to a trans fatty acid, or vice versa. A non-hydrogenated fat composition is a composition comprising only non-hydrogenated fatty acids, meaning that the process of hydrogenation has not been performed on the fatty acids in said composition.

The fat composition, which is a non-hydrogenated fat composition, is a fat composition, which maintains a clean label.

In one or more embodiments, the fat composition comprises at least 1% by weight of the sum of MOM and MMO triglycerides compared to the total weight of triglycerides, such as at least 2%, such as at least 3%, or such as at least 4% by weight of the sum of MOM and MMO triglycerides compared to the total weight of triglycerides.

In one or more embodiments, the fat composition comprises at least 1% by weight of the sum of MStM, MMSt, MPM, and MMP triglycerides compared to the total weight of triglycerides, such as at least 2%, such as at least 3%, such as at least 4%, or such as at least 5% by weight of the sum of MStM, MMSt, MPM, and MMP triglycerides compared to the total weight of triglycerides.

In one or more embodiments, the fat composition comprises at least 1% by weight of the sum of MOSt, MStO, MOP, and MPO triglycerides compared to the total weight of triglycerides, such as at least 2%, such as at least 3%, such as at least 4%, or such as at least 5% by weight of the sum of MOSt, MStO, MOP, and MPO triglycerides compared to the total weight of triglycerides.

In one or more embodiments, the fat composition comprises at least 1% by weight of the sum of MMM triglycerides compared to the total weight of triglycerides, such as at least 2%, such as at least 3%, such as at least 4%, or such as at least 5% by weight of the sum of MMM triglycerides compared to the total weight of triglycerides.

In one or more embodiments, the fat composition comprises at least 5% by weight of the sum of MMM, MOM, MMO, MStM, MMSt, MPM, MMP, MOSt, MStO, MOP, and MPO triglycerides compared to the total weight of triglycerides, such as at least 7%, such as at least 9%, such as at least 10%, such as at least 12%, such as at least 14%, or such as at least 15% by weight of the sum of MMM, MOM, MMO, MStM, MMSt, MPM, MMP, MOSt, MStO, MOP, and MPO triglycerides compared to the total weight of triglycerides.

In one or more embodiments, the fat composition comprises from 4% to 40% by weight of C14-fatty acids compared to the total weight of fatty acids, such as from 4% to 35%, such as from 4% to 30%, such as from 4% to 25%, such as from 4% to 20%, or such as from 4% to 15% by weight of C14-fatty acids compared to the total weight of fatty acids.

In one or more embodiments, the fat composition comprises from 40% to 90% by weight of saturated fatty acids compared to the total weight of fatty acids, such as from 40% to 85%, such as from 40% to 80%, such as from 40% to 75%, such as from 45% to 75%, or such as from 50% to 75% by weight of saturated fatty acids compared to the total weight of fatty acids.

In one or more embodiments, the fat composition comprises from 20% to 70% by weight of the sum of SatSatO and SatOSat triglycerides compared to the total weight of triglycerides, such as from 25% to 70%, such as from 30% to 70%, such as from 35% to 70%, such as from 40% to 70%, such as from 40% to 65%, such as from 40% to 60%, or such as from 40% to 55% by weight of the sum of SatSatO and SatOSat triglycerides compared to the total weight of triglycerides.

In one or more embodiments, the ratio of the weight of SatSatO triglycerides to the weight of SatOSat triglycerides in the fat composition is between 1.0 and 5.0, such as between 1.0 and 4.0, such as between 1.0 and 3.0, such as between 1.0 and 2.5, such as between 1.2 and 2.5, or such as between 1.2 and 2.2.

In one or more embodiments, the fat composition comprises a ratio of the weight of SatOSat triglycerides to the weight of SatSatO triglycerides in the fat composition is between 0.20 and 1.00, such as between 0.25 and 1.00, such as between 0.33 and 1.00, such as between 0.40 and 1.00, such as between 0.40 and 0.83, or such as between 0.45 and 0.83.

In one or more embodiments, the fat composition is composed of at least a first triglyceride composition and a second triglyceride composition; wherein the first triglyceride composition comprises fatty acids randomly distributed on a glycerol backbone, and wherein the first triglyceride composition comprises: from 0% to 15% by weight of C12-fatty acids compared to the total weight of fatty acids in the first triglyceride composition; from 20% to 90% by weight of C14-fatty acids compared to the total weight of fatty acids in the first triglyceride composition; from 0% to 50% by weight of the sum of saturated C16-, C18-, C20-, C22-, C24-fatty acids compared to the total weight of fatty acids in the first triglyceride composition; and from 50% to 90% by weight of saturated fatty acids compared to the total weight of fatty acids in the first triglyceride composition.

In one or more embodiments, the second triglyceride composition is a middle fraction of a randomly interesterified fat blend.

In one or more embodiments, the middle fraction of a randomly interesterified fat blend is based on palm- and shea oil fractions.

In one or more embodiments, the middle fraction of a randomly interesterified fat blend is based on palm- and shea-oil fractions. The middle fraction of randomly interesterified fat blend based on palm and shea fractions can be obtained from palm oil, palm oil fractions, shea oil, shea oil fractions, or combinations thereof. The middle fraction of randomly interesterified fat blend based on palm and shea fractions comprises, but not limited to, e.g. triglycerides of which from 1% to 5% by weight is selected from StOSt and StStO, from 13% to 18% by weight is selected from POSt and PStO, from 42% to 45% by weight is selected from POP and PPO, from 60% to 66% by weight is selected from SatOSat, SatSatO, or combinations thereof, and wherein the ratio of SatSatO to SatOSat is in a range from 1.8 to 2.2; wherein Sat is a saturated fatty acid selected from St (stearic acid), P (palmitic acid), or combinations thereof.

In one or more embodiments, the first triglyceride composition is comprised in an amount from 5% to 80% by weight compared to the total weight of the sum of the first triglyceride composition and the second triglyceride composition, such as 5% to 70% by weight, such as 5% to 60% by weight, such as 5% to 50% by weight, such as 5% to 40% by weight, such as 5% to 30% by weight, such as 5% to 25% by weight, or such as 5% to 20% by weight compared to the total weight of the sum of the first triglyceride composition and the second triglyceride composition.

By "the first triglyceride composition being in an amount from 5% to 80% by weight compared to the total weight of the sum of the first triglyceride composition and the second triglyceride composition" is meant that between 5% and 80% of the total weight of both the first triglyceride composition and the second triglyceride composition is from the first triglyceride composition.

In one or more embodiments, the second triglyceride composition is comprised in an amount from 20% to 95% by weight compared to the total weight of the sum of the first triglyceride composition and the second triglyceride composition, such as 30% to 95% by weight, such as 40% to 95% by weight, such as 50% to 95% by weight, such as 60% to 95% by weight, such as 70% to 95% by weight, such as 70% to 90% by weight, such as 70% to 85% by weight, such as 70% to 80% by weight, or such as 75% to 80% by weight compared to the total weight of the sum of the first triglyceride composition and the second triglyceride composition.

By "the second triglyceride composition being in an amount from 20% to 95% by weight compared to the total weight of the sum of the first triglyceride composition and the second triglyceride composition" is meant that between 20% and 95% of the total weight of both the first triglyceride composition and the second triglyceride composition is from the second triglyceride composition.

The fat composition composed of the first triglyceride composition and the second triglyceride composition can be obtained by any combination of mixing the first triglyceride composition and the second triglyceride composition as long as the first triglyceride composition is in the weight range between 5% and 80%, and the second triglyceride composition is in the weight range between 20% and 95%.

Further disclosed herein is a fat and cocoa butter composition comprising a fat composition as disclosed herein and a cocoa butter containing component selected from cocoa butter, cocoa mass, and/or cocoa powder, wherein the cocoa butter containing component is in an amount resulting in a cocoa butter content in an amount between 5% and 30% by weight compared to the total weight of fat in the fat and cocoa butter composition.

In one or more embodiments, the cocoa butter containing component is in an amount resulting in a cocoa butter content in an amount between 6% and 30% by weight compared to the total weight of fat in the fat and cocoa butter composition, such as between 10% and 30% by weight, such as between 15% and 30% by weight, or such as between 20% and 30% by weight.

Further disclosed herein is the use of a fat composition as disclosed herein for bakery, dairy, or confectionary applications, or in coating or enrobing for nuts, bakery or confectionary applications, such as bakery or confectionary application or confectionary moulding applications, selected from biscuit, cake, muffin, donut, pastry, or bread applications; or in fillings, such as bakery fillings and confectionary fillings; or for chocolate and chocolate-like coatings; or for chocolate or chocolate-like spreads, which are spreadable at room temperature.

Further disclosed herein is the use of a fat and cocoa butter composition as disclosed herein for bakery, dairy, or confectionary applications, or in coating or for nuts, bakery or confectionary applications, such as bakery or confectionary application or confectionary moulding applications, selected from biscuit, cake, muffin, donut, pastry, or bread applications; or in fillings, such as bakery fillings and confectionary fillings; or for chocolate and chocolate-like coatings; or for chocolate or chocolate-like spreads, which are spreadable at room temperature.

Further disclosed herein is a confectionary or chocolate or chocolate-like product comprising between 25% and 70% by weight, such as between 25% and 60%, such as between 25% and 50%, such as between 25% and 40%, or such as between 28% and 40% by weight of a fat composition as disclosed herein.

In one or more embodiments, the confectionary or chocolate-like product comprises between 0.1% and 2% sorbitan tristearate (STS).

The present invention is further illustrated by the following examples, which are not to be construed as limiting the scope of protection.

EXAMPLES

Example 1: Esterification of Glycerol with Free Fatty Acids

Glycerol and fatty acids were mixed to provide the reaction mixture according to Table 1. The reaction mixture was placed in a 6 L three-necked flask, equipped with a vacuum inlet, a cold trap, and a condenser heated to 70° C. The reaction mixture was heated to 170° C. within 30 minutes under reduced pressure of approximately 100-150 mbar. The reaction mixture was kept at 170-180° C. for 7 hours where the pressure was reduced stepwise to 33 mbar as the reaction time progressed. The temperature was then raised to 210° C. Once the temperature reached 210° C., the reaction mixture was held for 2 hours. Excess free fatty acids from the reaction mixture were distilled off at 240° C. under reduced pressure. The final fat composition was obtained once the crude oil was bleached, filtered, and deodorized.

Table 1: The esterification feed composition, free fatty acid composition and solid fat content (SFC) of the triglyceride compositions (esterification product) obtained from the esterification process.

TABLE 1

| Esterification product | Fat A | Fat B |
|---|---|---|
| Glycerol (g) | 179.0 | 127.5 |
| 99% Lauric acid (g) | 0.0 | 274.0 |
| 99% Myristic acid (g) | 1127.0 | 1098.0 |
| 98% Palmitic acid (g) | 112.5 | 0.0 |
| 98% Stearic acid (g) | 185.5 | 0.0 |
| 82% Oleic acid (g) | 431.5 | 0.0 |
| Free fatty acid (FFA) | 0.3 | 0.2 |
| Monoglyceride (MAG) | 0.0 | 0.2 |
| Diglyceride (DAG) | 3.6 | 4.3 |
| Triglyceride (TAG) | 95.5 | 95.4 |
| Fatty acid composition of the esterification product | | |
| C12:0 (% w/w) | 0.0 | 18.9 |
| C14:0 (% w/w) | 59.5 | 79.8 |
| C16:0 (% w/w) | 6.5 | 0.3 |
| C18:0 (% w/w) | 11.0 | 0.4 |
| C18:1 (% w/w) | 19.5 | 0.4 |
| C18:2 (% w/w) | 2.9 | 0.0 |
| C20:0 (% w/w) | 0.2 | 0.0 |
| C20:1 (% w/w) | 0.0 | 0.0 |
| Other fatty acids | 0.4 | 0.2 |
| SAFA (% w/w) | 77.2 | 100.0 |
| Sum C16:0 to C24:0 (% w/w) | 17.7 | 0.7 |
| Solid fat content (SFC) of the esterification product | | |
| SFC (10° C.) | 91.4 | 98.2 |
| SFC (20° C.) | 82.1 | 97.8 |
| SFC (25° C.) | 70.0 | 97.6 |
| SFC (30° C.) | 53.6 | 96.8 |

TABLE 1-continued

| Esterification product | Fat A | Fat B |
|---|---|---|
| SFC (35° C.) | 34.0 | 90.4 |
| SFC (40° C.) | 10.5 | 64.4 |

The fatty acid composition of the fat compositions is analysed using IUPAC 2.301 (Methylation) and IUPAC 2.304 (GLC). The triglyceride composition of fat compositions is analysed using AOCS Ce 5b-89. The solid fat content (SFC) is measured according to IUPAC 2.150a.

Example 2: Fat Compositions

The esterification products produced according to example 1 (Fat A and Fat B) were blended with a middle fraction of a randomly interesterified fat blend based on palm and shea fractions (Fat C—see table 2) in a ratio of 20:80 (w/w). The fatty acid compositions and solid fat content of the fat compositions obtained is shown in table 3 below. Fat F is based on a commercially available non-hydro CBR, Akopol™ NH 53.

TABLE 2

| Randomly interesterified fat blend based on palm and shea fractions | Fat C |
|---|---|
| StOSt + StStO (% w/w) | 3.2 |
| POSt + PStO (% w/w) | 15.6 |
| POP + PPO (% w/w) | 43.8 |
| Sum C16:0 to C24:0 (% w/w) | 63.9 |
| Sum of SatSatO and SatOSat (% w/w) * | 63 |
| Ratio SatSatO/SatOSat * | 2 |

*Where Sat is selected from saturated fatty acids C16:0-C24:0.

Table 3: Fatty acid composition and solid fat content of the fat compositions after mixture of the esterification products produced according to example 1 with the randomly interesterified fat blend based on palm and shea fractions according to the amounts in the table.

TABLE 3

| Fat composition | Fat D | Fat E (Comp.) | Fat F (Comp.) |
|---|---|---|---|
| Fat A (% w/w) (Esterification product) | 20 | — | — |
| Fat B (% w/w) (Esterification product) | — | 20 | — |
| Fat C (% w/w) (randomly interesterified fat blend based on palm and shea fractions) | 80 | 80 | — |
| Akopol ™ NH 53 (% w/W) | — | — | 100 |
| Fatty acid composition | | | |
| C12:0 (% w/w) | 0.2 | 4.0 | 4.2 |
| C14:0 (% w/w) | 12.5 | 16.8 | 2.6 |
| C16:0 (% w/w) | 45.6 | 43.3 | 50.5 |
| C18:0 (% w/w) | 10.2 | 8.4 | 9.5 |
| C18:1 (% w/w) | 26.0 | 22.2 | 26.6 |
| C18:2 (% w/w) | 4.2 | 4.0 | 4.7 |
| C20:0 (% w/w) | 0.4 | 0.5 | 0.5 |
| C20:1 (% w/w) | 0.1 | 0.1 | 0.1 |
| Other fatty acids (% w/w) | 0.8 | 0.7 | 1.3 |
| Trans fatty acids (% w/w) | <1.0 | <1.0 | <1.0 |
| SAFA (% w/w) | 69.0 | 73.1 | 67.8 |
| Sum of SatSatO and SatOSat (% w/w) * | 50.4 | 50.4 | 59.9 |
| Ratio SatSatO/SatOSat * | 2.0 | 2.0 | 2.0 |
| MMM (% w/w) | 5.1 | 9.2 | <1 |

TABLE 3-continued

| Fat composition | Fat D | Fat E (Comp.) | Fat F (Comp.) |
|---|---|---|---|
| Sum of MMO and MOM (% w/w) | 4.2 | <1 | <1 |
| Sum of MMSt, MStM, MMP, and MPM (% w/w) | 3.8 | <1 | <1 |
| Sum of MStO, MOSt, MPO, and MOP (% w/w) | 2.4 | 1.2 | 2.0 |
| Solid fat content (SFC) of fat composition | | | |
| SFC (10° C.) | 92.9 | 94.1 | 92.3 |
| SFC (20° C.) | 83.8 | 87.1 | 84.5 |
| SFC (25° C.) | 62.6 | 65.4 | 58.2 |
| SFC (30° C.) | 40.8 | 40 | 33.3 |
| SFC (35° C.) | 17.1 | 13.6 | 12.7 |
| SFC (40° C.) | 1.9 | <0.5 | <0.5 |

* Where Sat is selected from saturated fatty acids C16:0-C24:0.

The analyses methods used to analyse the composition are similar to the ones disclosed for table 1.

Example 3: Recipes and Manufacture of Dark Chocolate-Like Compounds

Three different dark chocolate-like compounds were produced according to the recipe given in table 4 without adding cocoa mass to the recipe (Low CB) and using fat compositions D, E, and F, respectively, resulting in chocolate-like compounds D-L, E-L, and F-L (L denoting low amount of cocoa butter on the fat basis in the recipe).

Three other dark chocolate-like compounds were also produced according to the recipe given in table 4 including addition of cocoa mass to the recipe (High CB) and using fat compositions D, E, and F, respectively, resulting in chocolate-like compounds D-H, E-H, and F-H (H denoting 'high' amount of cocoa butter on the fat basis in the recipe).

All the ingredients for producing the dark chocolate-like compounds (except lecithin and some of the fat) were mixed in a Hobart N-50 mixer at 65° C. for 10 minutes and refined in a Buhler SDY-300 three-roll refiner (with 300 mm width) to a particle size of approximately 20μ. Afterwards, the dark compounds were conched in the Hobart mixer for 6 hours at 65° C. After conching for 5.5 hours, the lecithin was added and after 5.75 hours, the rest of the fat was added and conching was continued. The chocolate-like compounds produced were used for making 50 g tablets and for coating biscuits, which were subsequently cooled in a three-zone cooling tunnel with temperatures of 15° C., 12° C., and 15° C., respectively.

Table 4: The recipe for a dark chocolate compound comprising either low CB or high CB.

TABLE 4

| Dark chocolate-like compound composition | Low CB | High CB |
|---|---|---|
| Chocolate-like compound | D-L/E-L/F-L | D-H/E-H/F-H |
| Fat D, E, or F (% w/w) | 34.30 | 28.56 |
| Cocoa powder (10-12% CB) (% w/w) | 15.00 | 9.25 |
| Sugar (% w/w) | 43.58 | 43.58 |
| Sorbitan tristearate (STS) (% w/w) | 0.70 | 0.58 |
| Skim milk powder (% w/w) | 6.00 | 6.00 |
| Lecithin (% w/w) | 0.40 | 0.40 |
| Vanillin (% w/w) | 0.02 | 0.02 |
| Cocoa mass (% w/w) | 0.00 | 11.61 |
| The fat composition distribution in the recipe | | |
| Fat + STS (%) | 95.3 | 79.3 |
| Cocoa butter (%) | 4.5 | 20.5 |

TABLE 4-continued

| Dark chocolate-like compound composition | Low CB | High CB |
|---|---|---|
| Milk fat (%) | 0.2 | 0.2 |
| Total fat content (g) | 36.7 | 36.7 |

As can be seen in table 4, the dark chocolate-like compounds have two different contents of cocoa mass/cocoa powder in their recipe and thus have cocoa butter contents of either 4.5% or 20.5% in their fat composition, denoted low and high respectively.

Example 4: Crystallization Rate of Biscuits Coated with Chocolate-Like Compounds Produced According to Example 3

Biscuits were coated with the dark chocolate-like compounds created above. Coating was performed at 45° C. in a Nielsen enrobing machine followed by cooling in a three-zone cooling tunnel at temperatures of 15° C., 12° C., and 15° C. for specific cooling periods. The coatings were evaluated immediately after the cooling period. The dark compound coatings on the biscuits are subjectively evaluated at specific cooling times and the coating is evaluated according to the following score scaling:

1. The coating is still liquid on some parts of the biscuit, while other parts are semi-solidified.
2. The whole coating is semi-solidified, but very sticky and very soft. There are no liquid coating parts on biscuits anymore.
3. The whole coating has solidified; however, the coating is still sticky, soft, and not ready for packaging.
4. The whole coating is hard and not sticky. It is possible to pack the product.

Score value 4 is the most important score as it indicates that the coated biscuits are ready for flow packing. Results of crystallization rate for the coated biscuits are illustrated in Table 5 where the specific cooling period needed to obtain a score of 4 for biscuits coated with each dark chocolate-like compound is shown.

Table 5: Crystallization rate of biscuits coated with the dark chocolate-like compounds

TABLE 5

| | Dark chocolate-like compound | | | | | |
|---|---|---|---|---|---|---|
| | D-L | E-L (Comp.) | F-L (Comp.) | D-H | E-H (Comp.) | F-H (Comp.) |
| | Fat composition | | | | | |
| | D | E | F | D | E | F |
| | Crystallization rate | | | | | |
| Specific cooling period needed to obtain a score of 4 (minutes) | 4 | 3 | 6 | 6 | 5 | >12 |

Results showed that the crystallization rate of the coated biscuits with chocolate-like compound D-H produced using fat composition D of invention with a high content of cocoa butter (20%) in its fat composition is comparable to a biscuit coated with chocolate-like compound F-L (produced using Akopol™ NH 53) with only low amount of cocoa butter (4.5%) in its fat composition. It is a known fact in the art that a reduction in crystallization rate of chocolate-like compounds is observed when the amount of cocoa butter in the fat phase is increased. Therefore, using the fat composition of the invention (fat D) provides the possibility to produce chocolate-like compounds with at least 20% cocoa butter in their fat phase without making a substantial compromise of functionality with respect to crystallization rate of the chocolate-like compound.

The crystallization rate was evaluated to show that by incorporating high amounts of cocoa butter, there was little impact on the crystallization rate. It is here shown that by adding high amount of cocoa butter the crystallization rate of the present invention is comparable to the crystallization rate of best in the market non-trans CBR with only 4.5% CB in its fat composition.

Example 5: Mould-Releasability of Tablets Produced Using the Chocolate-Like Compounds Made According to Example 3

The chocolate-like compounds produced according to example 3 were transferred into 50 g moulds at 45° C. followed by cooling in a three-zone cooling tunnel with temperatures of 15° C., 12° C., and 15° C., respectively for 30 minutes. The tablets were immediately evaluated after the cooling period. Table 6 summarizes the results of mould-releasability for the chocolate-like compound tablets, which were determined by counting the dry grids of the mould and expressing the results based on percentage of the dried grids out of the total grids of the mould.

Table 6: Mould-releasability of tablets made using the dark chocolate-like compounds

TABLE 6

| | Dark chocolate-like compound | | | | | |
|---|---|---|---|---|---|---|
| | D-L | E-L (Comp.) | F-L (Comp.) | D-H | E-H (Comp.) | F-H (Comp.) |
| | Fat composition | | | | | |
| | D | E | F | D | E | F |
| | Mould-releasability | | | | | |
| Mould releasability after 30 minutes of cooling (%) | 97 | 100 | 62 | 94 | 93 | 20 |

Results showed comparable mould-releasability for tablets made with dark chocolate-like compounds D-L and D-H with low and high cocoa butter in their fat composition, respectively and which are both made with the fat composition of invention (Fat D). This means that mould-releasability of chocolate-like compounds with 20% cocoa butter in their fat composition made with the fat composition of invention will not be negatively affected despite the high content of cocoa butter in the fat composition. Apart from this, tablets made with dark chocolate-like compound D-H comprising the fat composition of invention (Fat D) showed superior mould-releasability when compared to dark chocolate-like compound F-H comprising Akopol™ NH 53 (Fat F) when both contain 20% cocoa butter in their fat composition.

Example 6: Texture Analysis of Dark Chocolate-Like Compound Tablets

The chocolate-like compound tablets produced according to example 5 were stored at temperature of 20° C. for at least a week after they have been cooled for a total of 60 minutes (complete solidification). Texture measurement was performed at 20° C. using a TAX2 Plus texture analyzer with a P2 needle and 3 mm penetration. The tablets were penetrated until a standard deviation of below 5% was obtained (typically needed eight penetrations). Table 7 shows the mean values of measurements of the penetration force measured in grams.

Table 7: Texture measured in chocolate-like compound tablets as compared with the reference

TABLE 7

| | Dark chocolate-like compound | | | | | |
|---|---|---|---|---|---|---|
| | D-L | E-L (Comp.) | F-L (Comp.) | D-H | E-H (Comp.) | F-H (Comp.) |
| | Fat composition | | | | | |
| | D | E | F | D | E | F |
| | Texture analysis | | | | | |
| Texture after 1 week at 20 ° C. (g) | 445 ± 2 | 450 ± 3 | 415 ± 4 | 506 ± 4 | 420 ± 3 | 352 ± 5 |
| Texture after 1 month at 20 ° C. (g) | 456 ± 5 | — | 436 ± 4 | 492 ± 4 | — | 392 ± 5 |

Comparing dark-chocolate-like compounds with high cocoa butter content in their fat composition (20%) showed a significantly higher texture for dark-chocolate-like compound D-H made with the fat composition of invention (Fat D) as compared to dark-chocolate-like compounds E-H and F-H.

Example 7: Bloom-Stability of Dark-Chocolate-Like Compounds

The 50 g tablets and coated biscuits made using the chocolate-like compounds produced according to example 3 were cooled in a three-zone cooling tunnel with temperatures of 15° C., 12° C. and 15° C., respectively (1 hour for tablets and 15 minutes for coated biscuits). Afterwards, they were stored for a minimum of three days at 20° C. before being moved to cabinets with different temperatures of 15° C., 20° C., and 23° C. Bloom evaluations were made weekly and according to a scale from 1-10. Character 1 signifies heavy bloom and no gloss whereas character 10 signifies no bloom and high gloss. Character 4 marks the onset of a very weak bloom.

Table 8 illustrates the bloom-stability results for tablets and coated biscuits produced, where numbers in ( ) indicate the bloom-stability characters as described above after the amount of weeks that had lapsed. The experiment was discontinued when bloom value 3 (on the above scale) was reached, and the results are therefore no longer marked with a "larger than" sign (also marked with bold in the table).

Table 8: Bloom-stability results for tablets and coated biscuits

TABLE 8

| | Dark chocolate-like compound | | | | | |
|---|---|---|---|---|---|---|
| | D-L | E-L (Comp.) | F-L (Comp.) | D-H | E-H (Comp.) | F-H (Comp.) |
| | Fat composition | | | | | |
| | D | E | F | D | E | F |
| | Bloom stability of tablet | | | | | |
| 15° C./weeks (scale) | >52 (4) | >46 (8) | >52 (4) | >52 (8) | **25 (3)** | >14 (8) |
| 20° C./weeks (scale) | >52 (8) | **44 (3)** | >52 (7) | >52 (8) | **6 (3)** | **9 (3)** |
| | Bloom stability of coated biscuits | | | | | |
| 15° C./weeks (scale) | **29 (3)** | **15 (3)** | **3 (3)** | **27 (3)** | **29 (3)** | **2 (3)** |
| 20° C./weeks (scale) | >52 (8) | >46 (8) | >52 (8) | >52 (4) | **8 (3)** | **9 (3)** |
| 23° C./weeks (scale) | >52 (8) | >46 (8) | >52 (8) | >52 (8) | >46 (8) | >14 (8) |

Both coated biscuits and tablets made using the chocolate-like compounds comprised of the fat composition of invention (Fat D) with 20% cocoa butter in the fat phase were bloom-stable for more than 52 weeks at 20° C. This is superior to both coated biscuits and tablets made using the chocolate-like compounds E-H and F-H comprised of fats E and F, respectively which all bloomed in less than 2 weeks of storage at 20° C.

At 15° C., tablets made with the chocolate-like compound D-H comprising the fat composition of invention (Fat D) with 20% cocoa butter in the fat phase showed bloom-stability of more than 52 weeks whereas tablets made with chocolate-like compound E-H comprising fat E bloomed after only 25 weeks.

CONCLUSION

The examples above show that using the non-lauric, non-trans fat composition of the invention (Fat D) provides the possibility to produce chocolate-like compounds with at least 20% cocoa butter in the fat phase with long shelf-life and without having to make a substantial compromise of production like capacity in both coating and molding applications.

The invention claimed is:

1. A method of making a cocoa butter (CB) compatible cocoa butter replacer (CBR), the method comprising addition of a fat composition, the fat composition comprising:

from 4% to 50% by weight of C14-fatty acids compared to the total weight of fatty acids;

from 40% to 95% by weight of saturated fatty acids compared to the total weight of fatty acids;

from 15% to 70% by weight of the sum of SatSatO and SatOSat triglycerides compared to the total weight of triglycerides;

a ratio of the weight of SatSatO triglycerides to the weight of SatOSat triglycerides between 1 and 5;

at least 1% by weight of the sum of MOM and MMO triglycerides compared to the total weight of triglycerides;

at least 1% by weight of the sum of MMSt, MStM, MMP, and MPM triglycerides compared to the total weight of triglycerides;

at least 1% by weight of the sum of MStO, MOSt, MPO, and MOP triglycerides compared to the total weight of triglycerides; and at least 1% by weight of the sum of MMM triglycerides compared to the total weight of triglycerides;

wherein Sat is saturated fatty acids selected from C16-, C18-, C20-, C22-, and/or C24-fatty acids, and wherein M is myristic acid (C14:0), P is palmitic acid (C16:0), St is steric acid (C18:0), and O is oleic acid (C18:1).

2. The method according to claim 1, wherein the CBR is a non-trans CBR.

3. The method according to claim 1, wherein the CBR has at least 5% by weight compatibility with cocoa butter.

4. The method according to claim 1, wherein the fat composition comprises from 0% to 3% by weight of saturated C12-fatty acids compared to the total weight of fatty acids.

5. The method according to claim 1, wherein the fat composition comprises at least 1% by weight of the sum of MOM and MMO triglycerides compared to the total weight of triglycerides.

6. The method according to claim 1, wherein the fat composition comprises at least 1% by weight of the sum of MStM, MMSt, MPM, and MMP triglycerides compared to the total weight of triglycerides.

7. The method according to claim 1, wherein the fat composition comprises at least 1% by weight of the sum of MOSt, MStO, MOP, and MPO triglycerides compared to the total weight of triglycerides.

8. The method according to claim 1, wherein the fat composition comprises at least 1% by weight of the sum of MMM triglycerides compared to the total weight of triglycerides.

9. The method according to claim 1, wherein the fat composition comprises at least 5% by weight of the sum of MMM, MOM, MMO, MStM, MMSt, MPM, MMP, MOSt, MStO, MOP, and MPO triglycerides compared to the total weight of triglycerides.

10. The method according to claim 1, comprising from 4% to 40% by weight of C14-fatty acids compared to the total weight of fatty acids.

11. The method according to claim 1, comprising from 40% to 90% by weight of saturated fatty acids compared to the total weight of fatty acids.

12. The method according to claim 1, comprising from 20% to 70% by weight of the sum of SatSatO and SatOSat triglycerides compared to the total weight of triglycerides.

13. The method according to claim 1, wherein the ratio of the weight of SatSatO triglycerides to the weight of SatOSat triglycerides in the fat composition is between 1.0 and 5.0.

14. The method according to claim 1, wherein the fat composition is composed of at least a first triglyceride composition and a second triglyceride composition; wherein the first triglyceride composition comprises fatty acids randomly distributed on a glycerol backbone, and wherein the first triglyceride composition comprises:

from 0% to 15% by weight of C12-fatty acids compared to the total weight of fatty acids in the first triglyceride composition;

from 20% to 90% by weight of C14-fatty acids compared to the total weight of fatty acids in the first triglyceride composition;

from 0% to 50% by weight of the sum of saturated C16-, C18-, C20-, C22-, C24-fatty acids compared to the total weight of fatty acids in the first triglyceride composition; and from 50% to 90% by weight of saturated fatty acids compared to the total weight of fatty acids in the first triglyceride composition.

15. The method according to claim 14, wherein the second triglyceride composition is a middle fraction of a randomly interesterified fat blend.

16. The method according to claim 15, wherein the middle fraction of a randomly interesterified fat blend is based on palm- and shea oil fractions.

17. The method according to claim 14, wherein the first triglyceride composition is comprised in an amount from 5% to 80% by weight compared to the total weight of the sum of the first triglyceride composition and the second triglyceride composition.

18. The method according to claim 14, wherein the second triglyceride composition is comprised in an amount from 20% to 95% by weight compared to the total weight of the sum of the first triglyceride composition and the second triglyceride composition.

19. The method according to claim 1, wherein the fat composition is non-lauric.

20. The method according to claim 1, wherein the triglycerides and fatty acids of the fat composition are of vegetable origin, chemically synthesized, and/or synthesized by cultivation.

21. A fat and cocoa butter composition comprising a fat composition and a cocoa butter containing component selected from cocoa butter, cocoa mass, and/or cocoa powder, wherein the fat composition comprises:

from 4% to 50% by weight of C14-fatty acids compared to the total weight of fatty acids;

from 40% to 95% by weight of saturated fatty acids compared to the total weight of fatty acids;

from 15% to 70% by weight of the sum of SatSatO and SatOSat triglycerides compared to the total weight of triglycerides;

a ratio of the weight of SatSatO triglycerides to the weight of SatOSat triglycerides between 1 and 5;

at least 1% by weight of the sum of MOM and MMO triglycerides compared to the total weight of triglycerides;

at least 1% by weight of the sum of MMSt, MStM, MMP, and MPM triglycerides compared to the total weight of triglycerides;

at least 1% by weight of the sum of MStO, MOSt, MPO, and MOP triglycerides compared to the total weight of triglycerides; and at least 1% by weight of the sum of MMM triglycerides compared to the total weight of triglycerides;

wherein Sat is saturated fatty acids selected from C16-, C18-, C20-, C22-, and/or C24-fatty acids, and wherein M is myristic acid (C14:0), P is palmitic acid (C16:0), St is steric acid (C18:0), and O is oleic acid (C18:1) and wherein the cocoa butter containing component is in an amount resulting in a cocoa butter content in an amount between 5% and 30% by weight compared to the total weight of fat in the fat and cocoa butter composition.

22. The fat and cocoa butter composition according to claim 21, wherein the cocoa butter containing component is in an amount resulting in a cocoa butter content in an amount between 6% and 30% by weight compared to the total weight of fat in the fat and cocoa butter composition.

23. The method according to claim 1, comprising providing the fat composition for bakery, dairy, or confectionary applications, or in coating or enrobing for nuts, bakery or confectionary applications; or in fillings.

24. The fat and cocoa butter composition according to claim 21, wherein the fat and cocoa butter is provided for bakery, dairy, or confectionary applications, or in coating or for nuts, bakery or confectionary applications; or in fillings.

25. A confectionary or chocolate or chocolate-like product comprising between 25% and 70% by weight, wherein the fat composition comprises:

from 4% to 50% by weight of C14-fatty acids compared to the total weight of fatty acids;

from 40% to 95% by weight of saturated fatty acids compared to the total weight of fatty acids;

from 15% to 70% by weight of the sum of SatSatO and SatOSat triglycerides compared to the total weight of triglycerides;

a ratio of the weight of SatSatO triglycerides to the weight of SatOSat triglycerides between 1 and 5;

at least 1% by weight of the sum of MOM and MMO triglycerides compared to the total weight of triglycerides;

at least 1% by weight of the sum of MMSt, MStM, MMP, and MPM triglycerides compared to the total weight of triglycerides;

at least 1% by weight of the sum of MStO, MOSt, MPO, and MOP triglycerides compared to the total weight of triglycerides; and at least 1% by weight of the sum of MMM triglycerides compared to the total weight of triglycerides;

wherein Sat is saturated fatty acids selected from C16-, C18-, C20-, C22-, and/or C24-fatty acids, and wherein M is myristic acid (C14:0), P is palmitic acid (C16:0), St is steric acid (C18:0), and O is oleic acid (C18:1).

26. A confectionary or chocolate-like product according to claim 25, wherein the confectionary or chocolate-like product comprises between 0.1% and 2% sorbitan tristearate (STS).

* * * * *